(12) United States Patent
Pierce et al.

(10) Patent No.: US 8,165,444 B2
(45) Date of Patent: Apr. 24, 2012

(54) SYSTEM AND DEVICE FOR HAULING FIBRE OPTIC CABLE ALONG A CONDUIT

(75) Inventors: Andrew Eliot Pierce, Cherry Brook (AU); Alexander Mennie, Seaforth (AU)

(73) Assignee: Prysmian Telecom Cables & Systems Austalia Pty Ltd, Liverpool (AU)

( * ) Notice: Subject to any disclaimer, the term of this patent is extended or adjusted under 35 U.S.C. 154(b) by 1274 days.

(21) Appl. No.: 11/660,369

(22) PCT Filed: Aug. 26, 2005

(86) PCT No.: PCT/AU2005/001298
§ 371 (c)(1),
(2), (4) Date: Aug. 28, 2007

(87) PCT Pub. No.: WO2006/021055
PCT Pub. Date: Mar. 2, 2006

(65) Prior Publication Data
US 2011/0305424 A1 Dec. 15, 2011

(30) Foreign Application Priority Data
Aug. 27, 2004 (AU) .................... 2004904880

(51) Int. Cl.
*G02B 6/00* (2006.01)
(52) U.S. Cl. .................... 385/136; 385/134; 385/147
(58) Field of Classification Search .......... 385/134–136, 385/147
See application file for complete search history.

(56) References Cited

U.S. PATENT DOCUMENTS

| | | | |
|---|---|---|---|
| 4,514,058 A | 4/1985 | Walton | |
| 4,684,211 A | 8/1987 | Weber et al. | |
| 4,804,245 A | 2/1989 | Katayose et al. | |
| 5,013,125 A | 5/1991 | Nilsson et al. | |
| 5,039,196 A | 8/1991 | Nilsson | |
| 5,129,027 A | 7/1992 | Boero et al. | |
| 5,133,034 A * | 7/1992 | Arroyo et al. ............. | 385/107 |
| 5,480,203 A | 1/1996 | Favalora et al. | |
| 5,807,026 A | 9/1998 | Valette | |
| 5,863,083 A | 1/1999 | Giebel et al. | |
| 6,579,014 B2 | 6/2003 | Melton et al. | |
| 6,648,520 B2 | 11/2003 | McDonald et al. | |
| 2001/0033730 A1 | 10/2001 | Fentress | |
| 2010/0202748 A1 * | 8/2010 | Pierce et al. ............. | 385/136 |

FOREIGN PATENT DOCUMENTS

| | | |
|---|---|---|
| DE | 36 05 389 A1 | 8/1987 |
| DE | 94 09 660 U1 | 3/1995 |
| GB | 2 105 486 A | 3/1983 |
| JP | 58-189602 | 5/1983 |
| JP | 63-271402 | 9/1988 |

(Continued)

*Primary Examiner* — Rhonda Peace
(74) *Attorney, Agent, or Firm* — Finnegan, Henderson, Farabow, Garrett & Dunner, L.L.P.

(57) ABSTRACT

A system, device, fiber optic cable and/or method for hauling fiber optic cable along a conduit to a location. The system includes a fiber optic cable including an optic fiber, at least one first strengthening element and at least one second strengthening element, an optic connector attached to the at least one first strengthening element and able to be optically aligned with the optic fiber; and, a hauling shroud, including a cavity to receive the optic connector, a locking mechanism to removably hold the at least one second strengthening element and a member for attaching a hauling rope or cable to pull the fiber optic cable along the conduit.

21 Claims, 4 Drawing Sheets

FOREIGN PATENT DOCUMENTS

| | | |
|---|---|---|
| WO | WO 03/036358 A2 | 5/2003 |
| WO | WO 2004/044636 A1 | 5/2004 |
| WO | WO 2005/045494 A1 | 5/2005 |
| WO | WO 2005/096050 A2 | 10/2005 |
| WO | WO 2006/009597 A1 | 1/2006 |
| WO | WO 2006/029225 A1 | 3/2006 |
| WO | WO 2008036994 A1 * | 4/2008 |

* cited by examiner

SYSTEM AND DEVICE FOR HAULING FIBRE OPTIC CABLE ALONG A CONDUIT

CROSS REFERENCE TO RELATED APPLICATION

This application is a national phase application based on PCT/AU2005/001298, filed Aug. 26, 2005, and claims the priority of Australian Patent Application No. 2004904880, filed Aug. 27, 2004, the content of both of which is incorporated herein by reference.

TECHNICAL FIELD

The present invention relates to hauling or pulling fibre optic cable along a conduit, pipe or the like, and in particular, to a system, device, fibre optic cable and/or method for facilitating the hauling or pulling along the conduit, pipe or the like.

BACKGROUND ART

Traditionally, in a telecommunications network, users' or customers' premises are connected to a Public Switched Telephone Network (PSTN) by a lead-in cable consisting of either one or two pairs of copper conductors (wires). The lead-in cable is routed to a dwelling or other premises either aerially, in the case of an aerial Customer Access Network (CAN), or underground for the more recently deployed underground CANs.

Generally, new estates and residential developments, at least in Australia, now deploy cable underground. The cable is routed from a distribution point near a property boundary via a small plastic conduit to an entry point to a dwelling. The entry point is typically located at a convenient position, such as close to the electrical cable entry (meter box) or at some other point where access to the building is relatively straightforward.

The lead-in cable is generally pulled through the conduit, which typically has an internal diameter of 20 mm, by means of a thin cord. The cord is threaded through the conduit by first pushing a rigid rod through each 4.5 m length of conduit (rodding process) With the rope attached at one end. Having performed the rodding process it is then a simple matter to tie the rope to the end of the lead-in cable by means of a knot and then use the rope to haul the cable into and through the conduit. Most often the conduit does not form a completely straight line, but typically undulates and bends with a number of bend elements often being permitted with a radius of curvature down to about 100 mm.

There is an emerging need to replace copper conductor lead-in cable with fibre optic lead-in cable to provide users or customers with a range of new or improved services, such as Video on Demand (VoD), high speed Internet access, as well as telephone services over a single integrated network.

In the case of copper lead-in cable, the connection to the customer's equipment, whether the equipment is a standard telephone or a Digital Subscriber Line (DSL) modem, is straightforward and easily accomplished in the field with simple hand tools. The process may involve fitting a connector with screw terminals or, more likely, fitting a connector that can be secured by means of a simple hand operated crimping tool similar to a pair of pliers.

With the move to fibre optic systems the whole process becomes potentially far more complicated. While the fibre optic cable, and in particular the fibre, is very flexible the fibre optic cable cannot be tied to a hauling rope without fracturing the fibre or, at best, severely affecting the fibre's transmission characteristics. The connection to the Optical Network Unit (ONT) that effectively forms the interface from the new generation PSTN and the customer's equipment requires a fibre to fibre connection to be made.

The fibre used in these systems is typically singlemode which has a mode field diameter (the part of the fibre that carries the signal) of 9 microns. To obtain a good and reliable transmission it is necessary to butt two fibres together with sufficient precision such that the two extremely small mode fields align exactly. This process is typically accomplished in one of two ways. A direct fusion splice may be used whereby the two fibre ends are mounted in a complicated, high precision, fusion splicing machine that, using an electric arc, melts the two fibre end faces and fuses them together as one. Alternatively, a precision optical connector can be mounted on the end of each fibre and simply plugged together. Based on presently known technology, it is expensive and complicated, to fit a connector to a fibre optic cable in the field since the mating components of the connector have to be machined after fitting to the fibre to assure perfect alignment. Further, the end face of the connector has to be polished to minimise losses.

Some forms of cable hauling attachments are presently known. An electrical cable attachment made by Clipsal™ is designed for pulling electrical cables through conduits. These electrical cable attachments attach to the electrical cable by means of a rubber ring that is compressed onto the outer sheath of the cable by a conical gland nut. These devices are not suitable for use with fibre optic cable for at least the following reasons: (i) the outer diameter is large and would not fit through a 20 mm conduit commonly used in communication cable lead-ins; (ii) the device transfers the pulling load to the outer sheath rather than a strengthening element; (iii) there is no convenient way to house, seal and protect an optical connector.

A fibre optic cable pulling eye made by Poulen™ is commonly used for attaching hauling cord to fibre optic cables that are hauled into underground ducts. The device attaches to the cable either by the use of set screws that grip a central Glass Reinforced Plastic (GRP) element. Alternatively, the device grips onto a peripheral aramid strength member by crimping an outer sleeve down onto the cable. This device is problematic for at least the following reasons: (i) the device is very large and is designed for traditional multi loose tube configuration cables; (ii) in some fibre optic cables, for example cables for use in many residential CANs, there is no central strength element to be gripped; (iii) the crimp method of securing the eye is inappropriate in the necessarily small diameter of many conduits as the device is too large; (iv) there is no facility to protect a connector from the ingress of dirt and water.

Thus, there is a need for a relatively quick, simple and low cost installation of fibre optic lead-in cables to facilitate user or customer connections to new generation CANs. Many problems arise in seeking to deploy fibre optic lead-in cables using existing technology, these problems include:

(i) Presently known optical lead-in cables do not lend themselves to traditional installation methods since they cannot be hauled in the conventional way.
(ii) Connection of the optical lead-in cable to the ONT is relatively complicated.
(iii) The use of fusion splicing to connect to the ONT requires highly trained operators with complicated and expensive equipment that is not easily portable to the various locations where the splice is required.

(iv) It is not easily possible to fit optical connectors with the required level of performance in the field.
(v) The conduit from the distribution point to a customer's premises is small, normally being only 20 mm in diameter. The conduit is not straight in most installations.
(vi) A conventional fibre optic connector will not fit through a 20 mm conduit.
(vii) The development of a new estate is typically ad hoc in that once the sub-divisions are approved the infrastructure services are then installed. This typically means that electricity, water, gas and telecommunications services are pre-installed along the streets. At the time of installation it is required to pre-provision for each customer's requirements. There may then be anything up to perhaps 2-3 years before a customer's dwelling is built. This means that it is therefore necessary to be able to protect the fibre optic lead-in cable, and in particular the fibre end with a factory, or pre-fitted, connector attached, for at least this period of time from water (pits usually become flooded) and dirt (the working part of the fibre is only 9 microns in diameter).

This identifies a need for a system, device, fibre optic cable and/or method for facilitating the hauling or pulling of a fibre optic cable along a conduit, pipe or the like which overcomes or at least ameliorates some or all of the problems inherent in the prior art.

The reference to any prior art in this specification is not, and should not be taken as, an acknowledgment or any form of suggestion that such prior art forms part of the common general knowledge.

DISCLOSURE OF INVENTION

According to the present invention, an optic connector is connected to a fibre optic lead-in cable, in for example a factory, or the like, location. This provides the significant benefits that there is a controlled environment, access to the cable is relatively easy and appropriate machinery is available to fit, machine, polish and test the connector before the cable assembly is sent out for installation.

According to a first broad form, the present invention provides a system for hauling fibre optic cable along a conduit, the system including:

(1) a fibre optic cable, including an optic fibre, at least one first strengthening element and at least one second strengthening element;

(2) an optic connector attached to the at least one first strengthening element and able to be optically aligned with the optic fibre; and, (3) a hauling shroud, including a cavity to receive the optic connector, a locking mechanism to removably hold the at least one second strengthening element and a member for attaching a hauling rope or cable.

According to a second broad form, the present invention provides a hauling shroud for hauling fibre optic cable along a conduit, the hauling shroud including a cavity to receive an optic connector able to be attached to at least one first strengthening element of a fibre optic cable, a locking mechanism able to removably hold at least one second strengthening element of the fibre optic cable, and a member for attaching a hauling rope or cable.

According to a third broad form, the present invention provides a fibre optic cable, able to be hauled along a conduit, the fibre optic cable including an optic fibre, at least one first strengthening element and at least one second strengthening element, wherein an optic connector is able to be attached to the at least one first strengthening element and able to be optically aligned with the optic fibre, and wherein a hauling shroud is able to be attached to the fibre optic cable, the hauling shroud including a cavity to receive the optic connector and a locking mechanism to removably hold the at least one second strengthening element.

According to a fourth broad form, the present invention provides a method of manufacturing a fibre optic cable able to be hauled to a location via a conduit, the method including the steps of:

(1) producing the fibre optic cable, the fibre optic cable including an optic fibre, at least one first strengthening element and at least one second strengthening element;

(2) attaching an optic connector to the at least one first strengthening element and optically aligning the optic connector with the optic fibre; and, (3) removably attaching a hauling shroud using a locking mechanism to hold the at least one second strengthening element, the hauling shroud provided with a cavity to receive the optic connector and a member for attaching a hauling rope or cable.

BRIEF DESCRIPTION OF FIGURES

The present invention should become apparent from the following description, which is given by way of example only, of a preferred but non-limiting embodiment thereof, described in connection with the accompanying figures.

MODES FOR CARRYING OUT THE INVENTION

Figure 1:
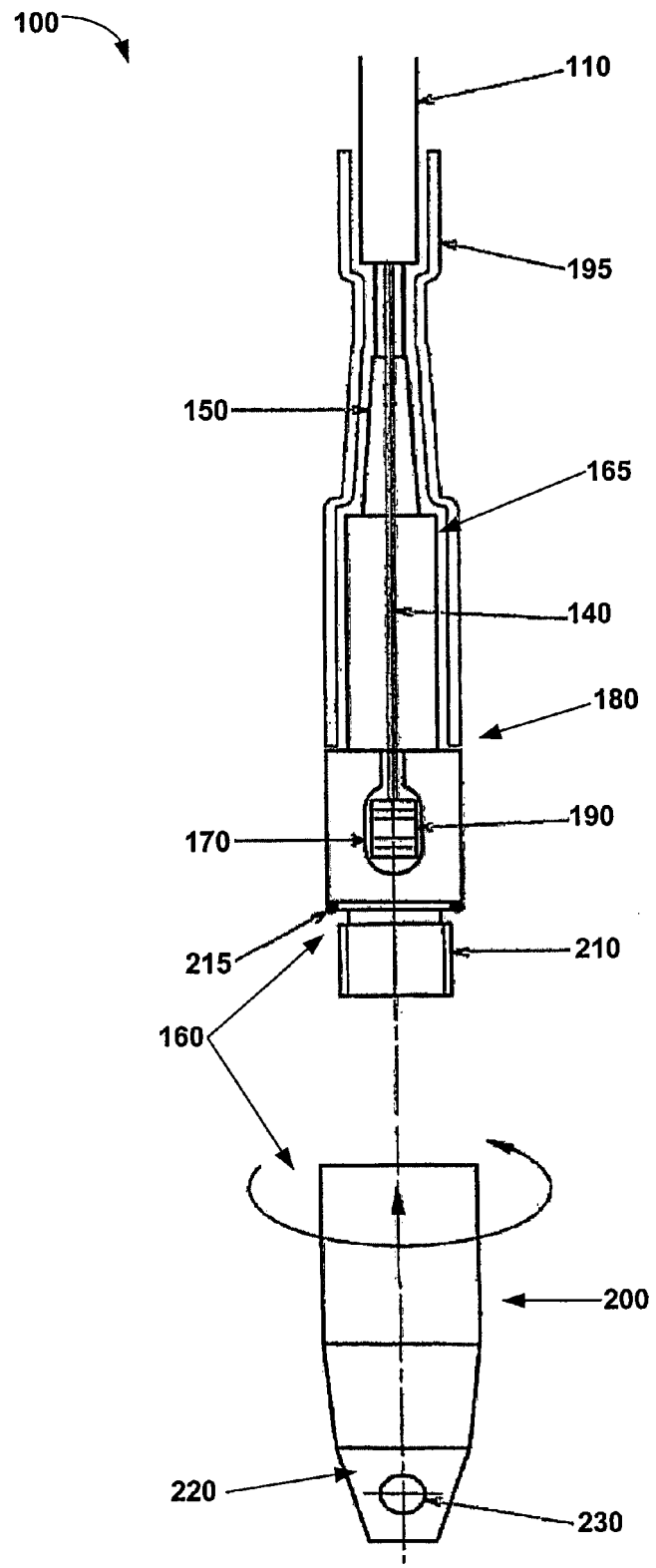
FIG. 1 illustrates an example system according to a particular embodiment of the present invention.

The following modes, given by way of example only, are described in order to provide a more precise understanding of the subject matter of the present invention.

In the figures, incorporated to illustrate features of an embodiment of the present invention, like reference numerals are used to identify like parts throughout the figures.

Figure 2:
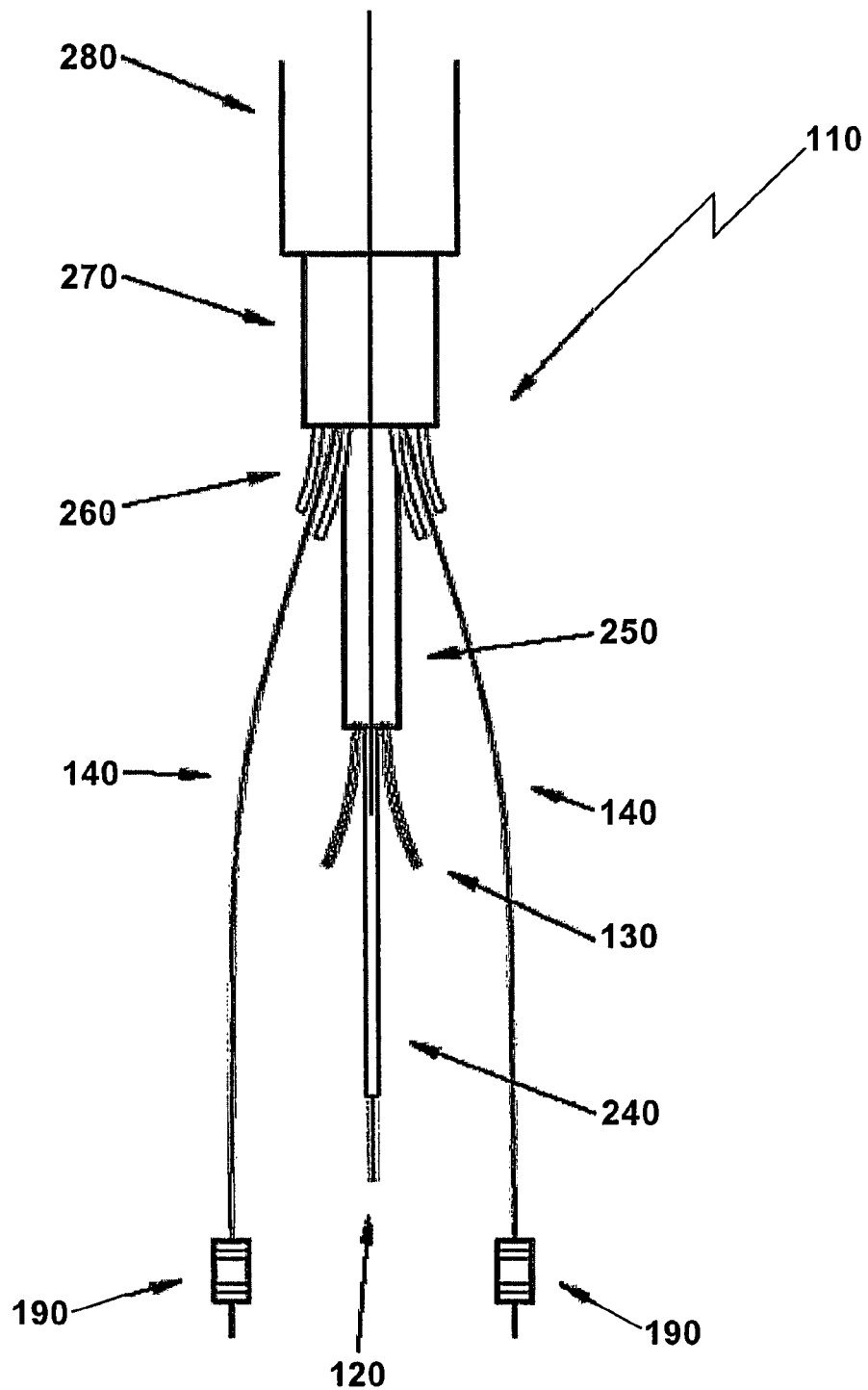
FIG. 2 illustrates an example fibre optic cable according to a particular embodiment of the present invention.

Referring to FIG. 1 and FIG. 2, there is an apparatus/system 100 for hauling fibre optic cable along a conduit. System 100 includes a fibre optic cable 110 which includes an optic fibre 120 and at least one first strengthening element 130 and at least one second strengthening element 140. There is also provided an optic connector 150 (partially illustrated in FIG. 1) attached to the at least one first strengthening element 130 and able to be optically aligned with the optic fibre 120. A hauling shroud 160 includes a cavity within boss 165 to receive the optic connector 150. A locking mechanism is provided by the combination of recess 170 in hauling shroud housing 180 which receives crimp lug 190, the crimp lug 190 held in place by retaining sleeve 200 which is in threaded engagement with retaining thread 210. The crimp lug 190 is attached to the at least one second strengthening element 140, thereby removably holding the at least one second strengthening element 140, and thus the cable 110, to the hauling shroud 160, which term as used herein includes both the housing (or body) 180 and sleeve 200.

Retaining sleeve 200 is preferably provided with a tongue or tab member 220 with a bore or hole 230 for attaching a hauling rope or cable. In an alternate embodiment, a tongue or tab member, with a bore or hole for attaching a hauling rope or cable, could be attached to housing 180 adjacent to and extending beyond thread 210. In this alternate embodiment, retaining sleeve is then provided with a hole or bore which allows the tongue or tab member to protrude through the retaining sleeve providing a location to attach a hauling rope or cable.

Retaining sleeve 200 may be removed in the field providing access to the optical connector inside the hauling shroud 160, thereby allowing testing of the optical fibre cable and optical connector with the appropriate test equipment. Retaining sleeve 200 may then be simply relocated back in position on housing 180. The housing 180 can also be provided with a seal 215, such as an o-ring seal, which sits inside and is in contact with retaining sleeve 200, when attached to housing 180, to prevent moisture and water ingress. This advantageously allows simple and repeated field testing of the optical fibre cable and optical connector by simply removing the retaining sleeve 200, without the need to remove or refit the complete hauling assembly.

A preferred, but non-limiting, embodiment for each component of the system 100 is now described in more detail.

Fibre Optic Lead-in Cable 110:

Referring to FIG. 2, the cable 110 consists of a single fibre 120, typically single-mode but possibly multi-mode, that is preferably a tight acrylate buffered to a diameter of typically, for example, 245 μm. A polyamide, or other polymer material, jacket 240 can be provided about the fibre 120. The jacket 140 may be 900 μm diameter in a particular form. Around the tight buffered fibre 120 and jacket 240 is laid a number of strengthening elements such as aramid yarns 130 forming first strengthening elements. These elements 130 are used to attach to the ferrule of the optic connector 150. Around these yarns 130 is extruded a layer of polymer such as PVC or Modified Polyethylene to provide an inner jacket 250. The inner jacket 250 may be 2.4 mm in diameter in a particular form. Over the inner jacket 250 is laid a further strength element layer. This further strength element layer may consist of yarns of similar or composite materials. In the preferred embodiment there are two aramid yarns 140, forming second strengthening elements 140, in conjunction with a number of glass yarns 260 to achieve the required combination of strength and resistance to low temperature shrinkage. The aramid yarns 140 may contain water swelling polymers to further prevent the ingress of moisture. Over this further strength element layer is extruded one or two sheath materials to provide the required level of protection. In the preferred embodiment, composite layers of co-extruded polyethylene 270 for durability and polyamide 280 for reduced friction and termite resistance are applied.

The overall diameter of the cable 110 is important since space in the distribution joints, the pits in which they are housed and the conduits is extremely restricted. In the illustrated example a diameter of 5 mm has been achieved.

Hauling Shroud 160:

Referring back to FIG. 1, the hauling shroud 160 is used to transfer the force from a pulling cord (as the cable is hauled into the conduit) without transferring any of the force to the optical connector 150 (partially illustrated) and to provide a readily removable and effective seal to prevent contamination of the optical connector 150 until such time as the final optical connection is to be made.

The hauling shroud 160 comprises two main parts, the main body or housing 180 and a screwed retaining sleeve 200.

The body 180 may be made from various materials and both aluminium and acetal resin have been utilised. Other materials such as steel, brass, ABS or polyamide would all work effectively. The body 180 is largely cylindrical in shape, preferably, for example, 64 mm in length. Body 180 has a stepped hole bored in the centre from one end of boss 165 to house the connector 150. The connector 150 simply sits within the body 180 with some clearance all around.

The outer surface of the body 180 is stepped to allow for the fitting of a heatshrink sleeve 195 to provide a final seal. The congruence between hauling shroud 160 and cable strength members 140 lies in the inclusion of two blind grooves or recesses 170, set, in this particular example, 180° opposite one another, in which a metallic crimp lug 190, fitted to each aramid strength element 140 from the cable 110 can be located and trapped by the retaining sleeve 200 as the sleeve 200 is threaded onto retaining thread 210 of body 180. The end of the retaining sleeve 200 is reduced to a tongue or tab shape 220 with a cross drilled hole 230 through which a pulling cord can be attached. Various other cord attachment means are possible, for example, a flat end surface provided with a recess and a fixed cross-bar to which the cord can be attached.

The retaining sleeve 200 is typically made from the same material as the body 180, although other materials could be used. Sleeve 200 includes a drilled and tapped hole which mates with retaining thread 210, spanner flats can also be provided to assist in tightening. Sleeve 200 also includes a bored hole to fit about body 180. When it is desired to release the connector 150 for installation at an ONT, or perhaps for field testing, it is simply a matter of unscrewing the retaining sleeve 200 from body 180 and allowing the crimp lugs 190 to fall or be pulled free.

Shroud 160 may be provided with a moisture absorbing material, for example a silica gel packet or equivalent, to assist with long term moisture resistance. Moisture absorbing material may be placed within retaining sleeve 200 and/or body 180, or at any other appropriate position. In the particular example embodiment illustrated, shroud 160 is not hermetically sealed, and if installed in high humidity regions, the system may benefit from use of such moisture absorbing material.

Figure 3:
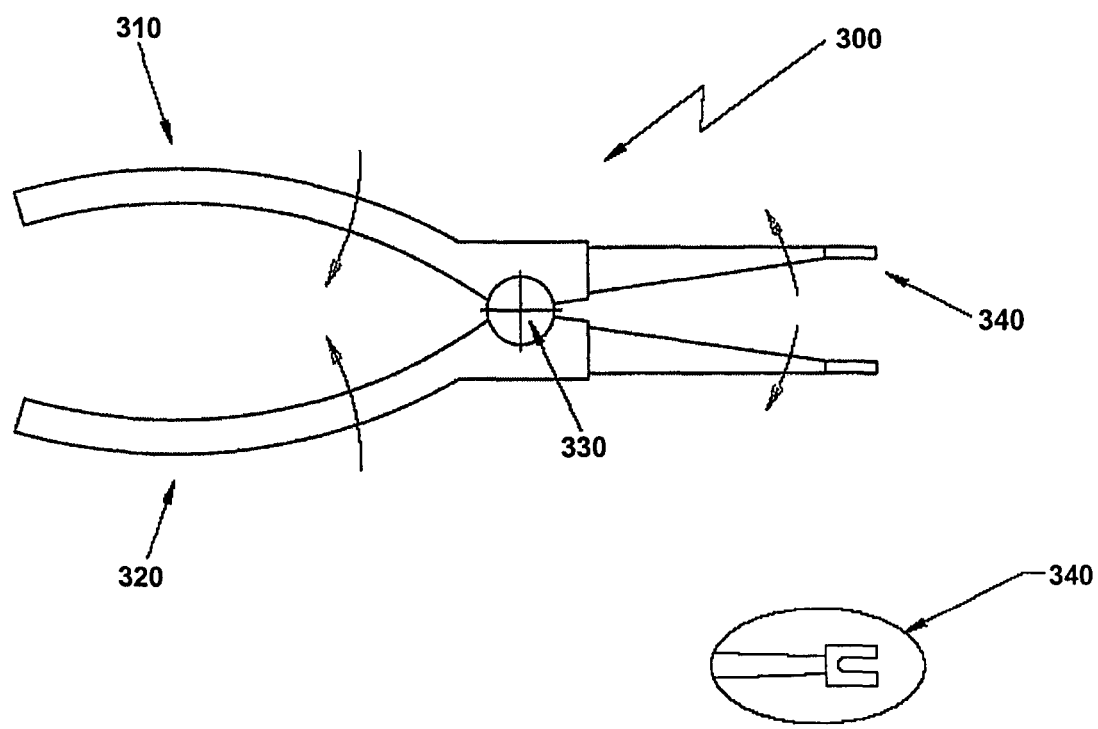
FIG. 3 illustrates an example of a tool adapted for use with a particular embodiment of the present invention; and, FIG. 4 illustrates an example layout of a fibre optic network in which particular embodiments of the present invention may be utilised.

Disassembly Pliers 500:

Referring to FIG. 3, to easily remove the sealing heatshrink sleeve 195 from the hauling shroud 160, in order to release the connector 150, it is possible to use a pair of pliers 300 that work in reverse and have modified jaws. When one squeezes the handle parts, being left arm 310 and right arm 320, together the jaws open about pivot 330 rather than close as traditional pliers would. The jaws have been made such that they have a tip 340 with a small groove in the end so that a tip 340 can slip under a crimp lug 190 fitted to the aramid yarn 140. By squeezing the arms 310, 320 together the pliers 300 separate the crimp lugs 190 and force the aramid yarn 140 to act in the fashion of a cheese cutter and cut through the heat shrink sleeve 195 thus releasing the connector 150.

Once the connector 150 has been released it is then a simple matter to fit an outer shell to the connector 150 with a simple hand held tool and to plug the completed connector into the ONT. No further installation work is required.

In a particular embodiment, the connector 150 may be a type of connector manufactured by Diamond SA, of Switzerland, called the Alburino connector, that is, in effect, modular. This type of connector has a central body (ferrule) to which the fibre is fitted and an outer part that links with a mating part on another connector to which it joins. All of the precision alignment work is undertaken on the ferrule part of the connector and this can be performed within a factory environment. The ferrule is extremely fragile and vulnerable in an external environment but is small in diameter and easily fits through a typical conduit.

Hauling shroud 160 seeks to provide a link between the hauling cord and the strengthening elements of the fibre optic cable 110 such that the force of hauling is transferred from the hauling cord to the strength elements 140 of the cable 110 without applying any stress to the connector 150. In a particular preferred, but non-limiting, embodiment provided by way of example, the boss 165 diameter is 8.0 mm, the stepped hole in boss 165 has a first segment having a diameter of 6.2 mm and depth of 12.0 mm and a second segment having a diameter of 4.8 mm and depth of 42.0 mm, each of the two recesses 170 (only one illustrated) are set 180° apart and are 11.0 mm long by 3.1 mm deep, the retaining thread 210 is of type M10 and 8.0 mm in length, the tongue 220 is less than 10.0 mm long, 8.0 mm wide and 3.5 mm thick, the cross-drilled hole 230 is 4.0 mm in diameter, body 180 has a diameter of 12.0 mm, retaining sleeve 200 is 14.0 mm in diameter and 24.9 mm in length, the drilled and tapped hole of retaining sleeve 200 is of matching type M10 and 8.0 mm deep, bore in retaining sleeve 200 is 12.1 mm wide and 16.0 mm deep, and spanner flats are 12.0 mm AF.

Figure 4:
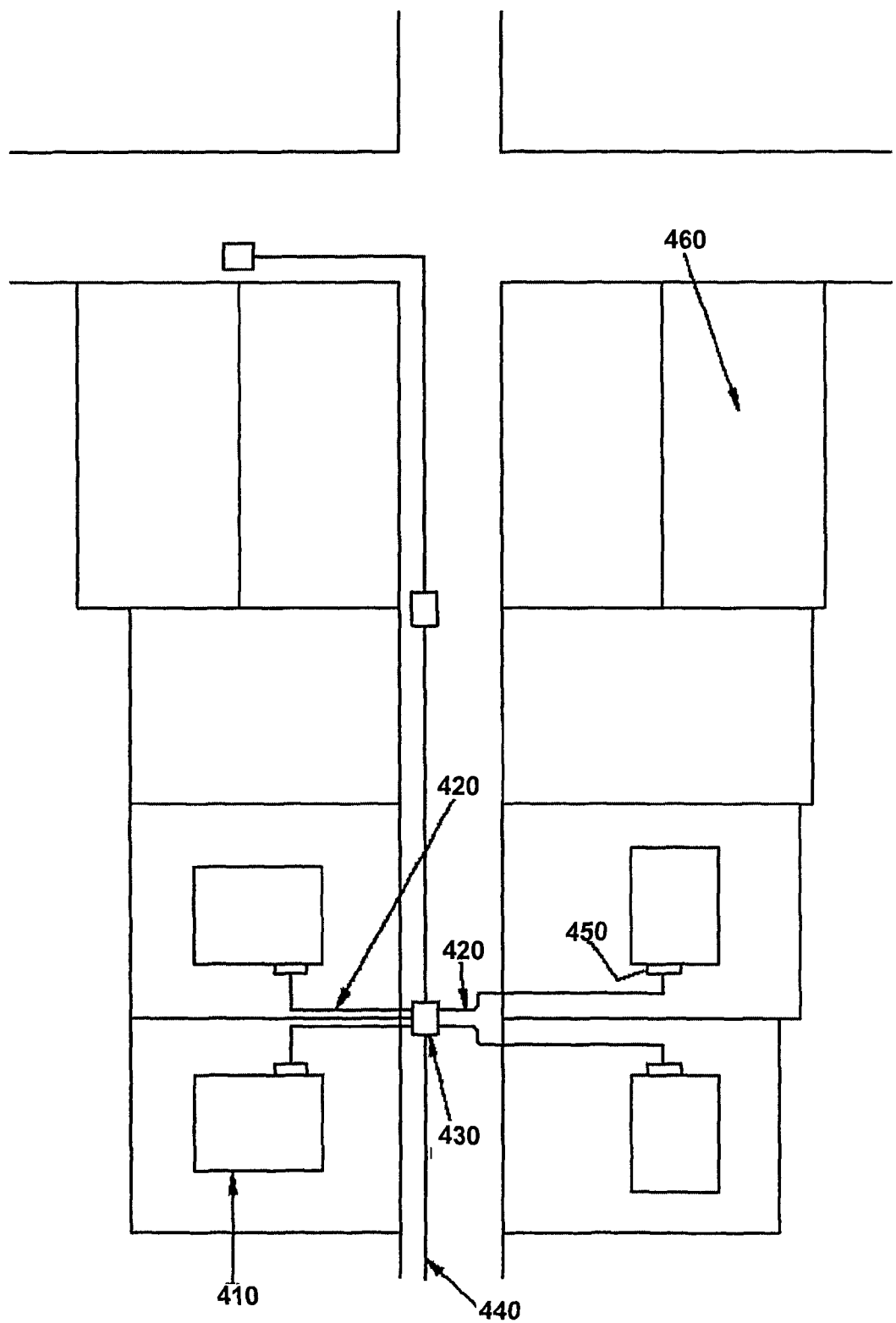

Referring to FIG. 4, an example layout for customer connection to a PSTN is shown. A customer dwelling 410 has associated lead-in conduits 420 that are typically 20 mm wide. Lead-in conduits 420 join dwelling 410 to distribution joint 430 which is in an underground pit. The lead-in cables can be coiled and stored in a pit until a dwelling is established (eg. at vacant block 460) or the actual connection is required. Distribution conduit 440 links to the distribution joint 430. ONT connection 450 is typically mounted to the side of a dwelling 410. Obviously, the present invention is applicable to hauling cables through conduits in general and should not be considered to be limited to particular types of dwellings, houses, buildings, etc.

Various embodiments of the present invention are possible. According to various embodiments of the present invention there may be provided one, two, three, or more, second strengthening elements, each attached to a crimp lug. Any number of recesses 170 can be provided about the body 180, subject to available space. The recesses 170 may be staggered to facilitate a greater number of recesses. Although the preferred embodiment utilises two recesses 170 and crimp lugs 190 it is possible to use a single recess and crimp lug, for example to reduce manufacturing costs.

Other devices may be used in place of the crimp lug 190, for example the second strengthening elements 140 might be fused, glued, clamped, etc., to an element or module adapted to sit, clip, fix or otherwise engage with or attach to the body 180. The retaining sleeve 200 may engage with body 180 by a variety of means other than threaded engagement, for example, the retaining sleeve 200 may clip to the body 180 using one or more springs or resilient clipping members. Alternatively, retaining sleeve 200 may not be required if the body 180 is provided with a rotatable or sliding cover member that acts to hold crimp lug 190 in a recess 170. Retaining sleeve 200 may be integrally formed with body 180. The reader will also appreciate that a variety of fibre optic cable configurations could be utilised, for example, more than one optic fibre could be provided in the cable 110.

Thus, there has been provided in accordance with the present invention, a system, device, fibre optic cable and/or method for facilitating the hauling or pulling of a fibre optic cable along a conduit, pipe or the like.

The invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A system for hauling fibre optic cable along a conduit, comprising:
    a fibre optic cable, comprising an optic fibre, at least one first strengthening element and at least one second strengthening element;
    an optic connector attached to the at least one first strengthening element and able to be optically aligned with the optic fibre; and
    a hauling shroud, comprising a cavity to receive the optic connector, a locking mechanism to removably hold the at least one second strengthening element and a member for attaching a hauling rope or cable,
    wherein said hauling shroud includes a housing including said cavity and a retaining sleeve removably attachable to said housing and carrying said member,
    wherein said locking mechanism comprises a recess in said housing and a crimp lug fitted to said at least one second strengthening element, and
    wherein said recess is suitable for housing and trapping said crimp lug when said retaining sleeve is attached to said housing and for releasing said crimp lug when said retaining sleeve is not attached to said housing.

2. The system as claimed in claim 1, wherein the at least one second strengthening element comprises of polymer fibres.

3. The system as claimed in claim 2, wherein the polymer fibres are aramid yarns.

4. The system as claimed in claim 3, wherein the aramid yarns contain a water swelling polymer.

5. The system as claimed in claim 1, wherein a plurality of first strengthening elements is used.

6. The system as claimed in claim 1, wherein the first strengthening element is aramid yarns.

7. The system as claimed in claim 1, wherein two second strengthening elements are used.

8. The system as claimed in claim 1, wherein said crimp lug is fitted at an end of the at least one second strengthening element.

9. A method of manufacturing a fibre optic cable capable of being hauled to a location via a conduit, comprising the steps of:
    producing the fibre optic cable, the fibre optic cable comprising an optic fibre, at least one first strengthening element and at least one second strengthening element;
    attaching an optic connector to the at least one first strengthening element and optically aligning the optic connector with the optic fibre;
    fitting a crimp lug to said at least one second strengthening element;
    locating said optical connector in a cavity of a housing of a hauling shroud and locating said crimp lug in a recess of said housing; and
    trapping said crimp lug in said recess by removably attaching to said housing a retaining sleeve provided with a member for attaching a hauling rope or cable.

10. A hauling shroud for hauling a fibre optic cable along a conduit, the hauling shroud comprising a cavity to receive an optic connector capable of being attached to at least one first strengthening element of said fibre optic cable, a locking mechanism capable of removably holding at least one second strengthening element of the fibre optic cable, and a member for attaching a hauling rope or cable, wherein said hauling shroud includes a housing including said cavity and a retaining sleeve removably attachable to said housing and carrying said member, wherein said locking mechanism comprises a recess in said housing and a crimp lug fitted to said at least one second strengthening element, and wherein said recess is suitable for housing and trapping said crimp lug when said retaining sleeve is attached to said housing and for releasing said crimp lug when said retaining sleeve is not attached to said housing.

11. The hauling shroud as claimed in claim 10, wherein said crimp lug is fitted at an end of the at least one second strengthening element.

12. The hauling shroud as claimed in claim 11, wherein the retaining sleeve is in threaded engagement with the housing.

13. The hauling shroud as claimed in claim 11, wherein the retaining sleeve is in resilient clipped engagement with the housing.

14. The hauling shroud as claimed in claim 11, wherein the retaining sleeve is in sliding engagement with the housing.

15. The hauling shroud as claimed in claim 11, comprising two or more second strengthening elements, each provided with said crimp lug and two or more associated recesses in the housing.

16. The hauling shroud as claimed in claim 15, wherein the recesses are staggered.

17. The hauling shroud as claimed in claim 10, wherein the member is a tongue member with a hole or bore.

18. The hauling shroud as claimed in claim 10, wherein the member is a cross-bar provided over a recess.

19. The hauling shroud as claimed in claim 10, wherein a sealing layer is provided at least partially about the shroud and the fibre optic cable.

20. The hauling shroud as claimed in claim 10, wherein the shroud comprises a moisture absorbing material.

21. The hauling shroud as claimed in claim 10, wherein the maximum external diameter of the shroud is less than 20 mm.

\* \* \* \* \*